UNITED STATES PATENT OFFICE.

HENRY BLUMENBERG, JR., OF LOS ANGELES, CALIFORNIA, ASSIGNOR OF ONE-THIRD TO HUGH F. STEWART, OF SOUTH PASADENA, CALIFORNIA, ONE-THIRD TO FRIEDA BLUMENBERG, OF NEW YORK, N. Y., AND ONE-THIRD TO GEORGE D. ROBERTSON, OF LOS ANGELES, CALIFORNIA.

PROCESS OF MAKING SUPERPHOSPHATE.

1,255,829.  Specification of Letters Patent.  Patented Feb. 5, 1918.

No Drawing.  Application filed October 16, 1917.  Serial No. 196,869.

*To all whom it may concern:*

Be it known that I, HENRY BLUMENBERG, Jr., a citizen of the United States, residing at Los Angeles, in the county of Los Angeles and State of California, have invented new and useful Improvements in Processes of Making Superphosphate, of which the following is a specification.

My invention relates to a fertilizer and a process of making the same.

Various attempts have been made to utilize acid tar or sludge from the oil refineries in California. Some have been successful, but, as a rule, the processes are not profitable unless carried on a large scale. Consequently the smaller refineries run off their acid into pits or sump holes, thereby wasting the same.

It is a well known fact that acid tar from oil refineries averages from 40% to 60% sulfuric acid, but it is extremely difficult to reclaim this acid for commercial uses. Sulfuric acid, at the present time, in Southern California, is worth from $30.00 to $40.00 per ton and any process for its utilization would naturally be a big help in the conservation of the natural resources of the nation.

I have found that by mixing acid tar and any phosphate material, such as crude phosphate rock, ground bone, or Thomas slag, and heating the same up to the charring point with the hydrocarbons that the mass contains, I make a fertilizer far superior to any of the standard superphosphates now in the market, on account of the fact that I am converting the toxic acid hydrocarbon sludges to a non-toxic carbonaceous material which is beneficial to plant life.

In carrying out my process, it is advisable to use a slight excess of the acid so that no reversion occurs in the heating, and when the oil has been burned and charred into carbon, mixing this charred phosphoric mass with a fresh batch of crude ore, so that a superphosphate is produced that has the qualities above described.

One can readily see that I produce a superphosphate material from a waste product that has absolutely no value and which various smaller oil refineries are glad to give away if one only makes the arrangements for taking care of the acid sludge as it leaves the mixers.

Acid sludge is becoming more and more a nuisance in the smaller refineries that are located in the larger cities where ground space is valuable.

Addition of the charred carbon in the mass makes a superphosphate exceedingly beneficial to plant life, thereby producing a superphosphate far superior to the standard product made from sulfuric acid alone.

Furthermore, by using a comparative waste product the cost of my production is far less than any known superphosphate process.

The finely pulverized calcareous phosphate rock is mixed with acid sludge, the latter being taken in quantity sufficient to convert all the phosphate rock into phosphoric acid and calcium sulfate. The mixture is treated in an open furnace at a temperature of 350° to 500° C., until all the volatile matter is driven off, and residual carbon from the hydrocarbonaceous matter is left disseminated throughout the mass in a finely divided state.

The chemical reactions involved are as follows:

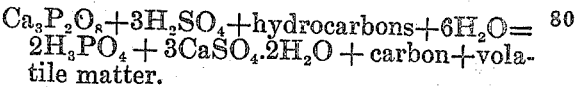
$Ca_3P_2O_8 + 3H_2SO_4 + \text{hydrocarbons} + 6H_2O = 2H_3PO_4 + 3CaSO_4.2H_2O + \text{carbon} + \text{volatile matter.}$ Then in mixing the above treated and charred mass with an additional finely pulverized crude phosphate rock, the following reaction takes place:

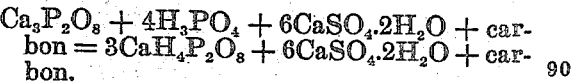
$Ca_3P_2O_8 + 4H_3PO_4 + 6CaSO_4.2H_2O + \text{carbon} = 3CaH_4P_2O_8 + 6CaSO_4.2H_2O + \text{carbon.}$ The crude phosphate rock in the reaction just given is added to the mixture while the mixture is maintained at a temperature of 350° to 500° C. If the mixture of phosphoric acid, calcium phosphate and carbon is cold when the crude phosphate rock is added, water in sufficient quantity to form a magma must be added, otherwise the reaction last given will not take place. The above reaction includes the calcium sulfate if the charred mass is mixed with the crude phosphate rock direct, but when the mass is leached with water, the calcium sulfate is eliminated, and the following reaction describes the process:

By this, however, we also eliminate the charred carbon mass and have only the advantages in my process of using the cheap sulfuric acid of the acid tar, but have not the beneficial effects of the charred mass described above. It can be readily seen that this is almost an ideal method of using the acid tar that is run to waste in such large quantities in this state.

I wish to bring forth the point that this process would not have the advantages as set forth by me were it not for the fact that I eliminate all the toxic qualities of the hydrocarbons by charring the mass as described above. By so doing, I make an ideal fertilizer mass. While it may be possible that under some conditions this acid tar could be used on some forms of plant life without charring the detrimental oily material, invariably this would not be safe or practical to do, for it is a well-known fact that crude oil will destroy almost any plant life when brought in continual contact with it.

The carbon derived from the hydrocarbon sludge is in a finely divided state disseminated throughout the entire mass of the fertilizer, and because of the well-known property of absorbing great quantities of gases such as carbon dioxid and ammonia, as well as water, this carbon improves the phosphate fertilizer materially, as it prevents these gases from escaping into the atmosphere and holds the same available for plant life.

Where the soil is apt to dry out, the property of holding water will tend to preserve the humidity of the soil and in this manner will serve as a substitute for humus in cases where the soil is deficient thereof.

I claim:

1. A fertilizer comprising phosphate material and finely divided carbon disseminated throughout the mass.

2. A fertilizer comprising phosphate material, gypsum, and finely divided carbon disseminated throughout the mass.

3. A process of making a phosphatic fertilizer, comprising mixing ground phosphate material with acid hydrocarbon sludge, and heating the mixture until all the volatile matter is driven off and residual carbon is left disseminated throughout the mass in a finely divided state.

4. A process of making a phosphatic fertilizer, comprising mixing ground phosphate material with acid hydrocarbon sludge, and heating the mixture to a temperature of 350° to 500° C., until all the volatile matter is driven off and residual carbon is left disseminated throughout the mass in a finely divided state.

5. A process of making a phosphatic fertilizer, comprising mixing ground calcareous phosphate material with acid hydrocarbon sludge, heating the mixture until all the volatile matter is driven off and residual carbon is left in a finely divided state, mixing ground calcareous phosphate rock with the mass, and heating the same, whereby a fertilizer containing acid calcium phosphate, gypsum, and finely divided carbon is produced.

6. A process of making a phosphatic fertilizer, comprising mixing ground calcareous phosphate material with acid hydrocarbon sludge, said sludge containing sulfuric acid in quantities sufficient to convert the phosphates into phosphoric acid and the base calcium into calcium sulfate, heating the mixture until all the volatile matter is driven off and residual carbon is left, and mixing ground calcareous phosphate in the presence of water with the mass, whereby a fertilizer containing acid calcium phosphate, gypsum and finely divided carbon is produced.

7. A process of making a phosphatic fertilizer, comprising mixing ground calcareous phosphate material with acid hydrocarbon sludge, said sludge containing sulfuric acid in quantities sufficient to convert the phosphates into phosphoric acid and the calcium base into calcium sulfate, heating the mixture until all the volatile matter is driven off and residual carbon is left, mixing ground calcareous phosphate in the presence of water with the mass, and separating the acid calcium phosphate from the mass.

In testimony whereof I have signed my name to this specification.

HENRY BLUMENBERG, Jr.